(12) United States Patent
El-Khamy et al.

(10) Patent No.: US 12,236,370 B2
(45) Date of Patent: Feb. 25, 2025

(54) METHOD AND APPARATUS FOR FEDERATED LEARNING

(71) Applicant: Samsung Electronics Co., Ltd., Gyeonggi-do (KR)

(72) Inventors: Mostafa El-Khamy, San Diego, CA (US); Weituo Hao, Durham, NC (US); Jungwon Lee, San Diego, CA (US)

(73) Assignee: Samsung Electronics Co., Ltd (KR)

( * ) Notice: Subject to any disclaimer, the term of this patent is extended or adjusted under 35 U.S.C. 154(b) by 927 days.

(21) Appl. No.: 17/179,964

(22) Filed: Feb. 19, 2021

(65) Prior Publication Data

US 2022/0058507 A1 Feb. 24, 2022

Related U.S. Application Data

(60) Provisional application No. 63/069,389, filed on Aug. 24, 2020.

(51) Int. Cl.
| | | |
|---|---|---|
| *G06N 7/00* | (2023.01) | |
| *G06N 7/01* | (2023.01) | |
| *G06N 20/00* | (2019.01) | |
| *H04L 67/10* | (2022.01) | |

(52) U.S. Cl.
CPC ............... *G06N 7/01* (2023.01); *G06N 20/00* (2019.01); *H04L 67/10* (2013.01)

(58) Field of Classification Search
None
See application file for complete search history.

(56) References Cited

U.S. PATENT DOCUMENTS

| | | |
|---|---|---|
| 8,612,368 B2 | 12/2013 | Burdick et al. |
| 9,633,315 B2 | 4/2017 | Chapelle et al. |
| 10,657,461 B2 | 5/2020 | McMahan et al. |

(Continued)

FOREIGN PATENT DOCUMENTS

| | | | |
|---|---|---|---|
| CN | 108154721 | 6/2018 | |
| WO | WO-2021228404 A1 * | 11/2021 | ......... G06F 21/6254 |

OTHER PUBLICATIONS

Li, Tian, et al. "Fair resource allocation in federated learning." arXiv preprint arXiv:1905.10497 (2019). (Year: 2019).*

(Continued)

*Primary Examiner* — Natisha D Cox
(74) *Attorney, Agent, or Firm* — The Farrell Law Firm, P.C.

(57) ABSTRACT

Methods and devices are provided for performing federated learning. A global model is distributed from a server to a plurality of client devices. At each of the plurality of client devices: model inversion is performed on the global model to generate synthetic data; the global model is on an augmented dataset of collected data and the synthetic data to generate a respective client model; and the respective client model is transmitted to the server. At the server: client models are received from the plurality of client devices, where each client model is received from a respective client device of the plurality of client devices; model inversion is performed on each client model to generate a synthetic dataset; the client models are averaged to generate an averaged model; and the averaged model is trained using the synthetic dataset to generate an updated model.

18 Claims, 3 Drawing Sheets

(56) References Cited

U.S. PATENT DOCUMENTS

| | | | |
|---|---|---|---|
| 11,461,690 B2* | 10/2022 | Szeto | G06N 20/10 |
| 11,699,080 B2* | 7/2023 | Zhu | G06N 5/01 |
| | | | 706/12 |
| 2015/0324690 A1 | 11/2015 | Chilimbi et al. | |
| 2017/0372201 A1 | 12/2017 | Gupta et al. | |
| 2019/0050746 A1 | 2/2019 | Sanketi et al. | |
| 2019/0227980 A1 | 7/2019 | McMahan et al. | |
| 2020/0081798 A1 | 3/2020 | Dornquast et al. | |
| 2022/0051146 A1* | 2/2022 | Verma | G06N 3/063 |

OTHER PUBLICATIONS

J. Shi, H. Zhao, M. Wang and Q. Tian, "Signal Recognition Based on Federated Learning," IEEE Infocom 2020—IEEE Conference on Computer Communications Workshops (INFOCOM WKSHPS), Toronto, ON, Canada, 2020, pp. 1105-1110, doi: 10.1109/INFOCOMWKSHPS50562.2020.9162958. (Year: 2020).*

Hao, Weituo, et al. "Towards fair federated learning with zero-shot data augmentation." Proceedings of the IEEE/CVF conference on computer vision and pattern recognition. 2021. (Year: 2021).*

Mohri, Mehryar et al., "Agnostic Federated Learning", arXiv:1902.00146v1 [cs.LG], 1 Feb. 1, 2019, pp. 30.

Kairouz, Peter et al., "Advances and Open Problems in Federated Learning", arXiv:1912.04977v1 [cs.LG], Dec. 10, 2019, pp. 105.

Yu, Han et al., "A Fairness-aware Incentive Scheme for Federated Learning", AIES '20: Proceedings of the AAAI/ACM Conference on AI, Ethics, and Society, . . . Feb. 2020, pp. 393-399, https://doi.org/10.1145/3375627.3375840.

Mcmahan, Brendan H. et al., "Communication-Efficient Learning of Deep Networks from Decentralized Data", arXiv:1602.05629v3 [cs.LG], Feb. 28, 2017, pp. 11.

Li, Tian et al., "Federated Learning: Challenges, Methods, and Future Directions", arXiv:1908.07873v1 [cs.LG], Aug. 21, 2019, pp. 21.

Li, Tian et al., "Federated optimization in heterogeneous networks", arXiv:1812.06127v5 [cs.LG], Apr. 21, 2020, pp. 22.

Yin, Hongxu et al., "Dreaming to Distill: Data-free Knowledge Transfer via DeepInversion", arXiv:1912.08795v2 [cs.LG], Jun. 16, 2020, pp. 16.

Cai, Yaohui et al., "ZeroQ: A Novel Zero Shot Quantization Framework", arXiv:2001.00281v1 [cs.CV], Jan. 1, 2020, pp. 12.

Li, Tian et al., "Fair Resource Allocation in Federated Learning", arXiv:1905.10497v2 [cs.LG], Feb. 14, 2020, pp. 27.

* cited by examiner

METHOD AND APPARATUS FOR FEDERATED LEARNING

PRIORITY

This application is based on and claims priority under 35 U.S.C. § 119(e) to a U.S. Provisional patent application filed on Aug. 24, 2020 in the United States Patent and Trademark Office (USPTO) and assigned Ser. No. 63/069,389, the contents of which are incorporated herein by reference.

FIELD

The present disclosure relates generally to machine learning methods, and more particularly, to methods and devices for improved fairness in federated learning.

BACKGROUND

Federated learning is a training paradigm that is utilized in domains where data is prohibited from leaving local client devices due to data sensitivity or privacy. However, in distributed scenarios, local client devices may exhibit high statistical heterogeneity. Many federated learning methods that pursue a single model overlook the bias that is generated towards dominant data distribution, which raises questions of fairness.

A model is considered to be more fair than another model, if the performance (e.g., accuracy) of the model on M different devices or classes is more uniform than the performance of the other model over the same devices or classes. Specifically, a resulting variance in the performance of the more-fair model is less than a resulting variance in the performance of the other model, when measured across the M classes or devices.

By keeping user data on each local client device and only sharing model updates with a global server, federated learning may enable the training of machine learning models on heterogeneous, distributed networks in a privacy-preserving manner. The server generates an average model by taking a weighted average of the local client models. In generating the average, the goal is to minimize the following objective function set forth in Equation (1) below:

$$\min_w f(w) = \sum_{k=1}^{N} p_k F_k(w) \quad (1)$$

where $F_k(w) := E_{x \sim D_k}[f_k(w; x\_k)]$ is the local objective function, N is the number of devices or clients, and $p_k \geq 0$ is the weight of each device.

Statistical heterogeneity of data distributions of client devices is a challenge in federated learning. When federated learning focuses on learning a single global model, it often suffers from divergence of the model since local client models may vary significantly.

SUMMARY

According to one embodiment, a method for performing federated learning at a client device is provided. The client device receives a global model from a server. The client device performs model inversion on the global model to generate synthetic data for one or more classes of data in the global model. The client device augments collected data in a dataset of the client device with the synthetic data to generate an augmented dataset having a more uniform distribution of data across classes than the dataset. The client device trains the global model on the augmented dataset to generate a client model. The client device transmits the client model from the client device to the server.

According to one embodiment, a method for performing federated learning at a server is provided. The server distributes a global model from the server to a plurality of client devices. The server receives client models from the plurality of client devices. Each client model is received from a respective client device of the plurality of client devices. The server performs model inversion on each client model to generate synthetic data for each client model. The server generates a synthetic dataset using the synthetic data from the client models. The server averages the client models to generate an averaged model. The server trains the averaged model using the synthetic dataset to generate an updated global model.

According to one embodiment, a client device is provided for performing federated learning. The client device includes a processor and a non-transitory computer readable storage medium storing instructions. When executed, the instructions cause the processor to receive a global model from a server, and perform model inversion on the global model to generate synthetic data for one or more classes of data in the global model. The instructions also cause the processor to augment collected data in a dataset of the client device with the synthetic data to generate an augmented dataset having a more uniform distribution of data across classes than the dataset. The instructions further cause the processor to train the global model on the augmented dataset to generate a client model, and transmit the client model to the server.

According to one embodiment, a server is provided for performing federated learning. The server includes a processor and a non-transitory computer readable storage medium storing instructions. When executed, the instructions cause the processor to distribute a global model to a plurality of client devices, and receive client models from the plurality of client devices. Each client model is received from a respective client device of the plurality of client devices. The instructions also cause the processor to perform model inversion on each client model to generate synthetic data for each client model, and generate a synthetic dataset using the synthetic data from the client models. The instructions further cause the processor to average the client models to generate an averaged model, and train the averaged model using the synthetic dataset to generate an updated global model.

BRIEF DESCRIPTION OF THE DRAWINGS

The above and other aspects, features, and advantages of certain embodiments of the present disclosure will be more apparent from the following detailed description, when taken in conjunction with the accompanying drawings, in which.

DETAILED DESCRIPTION

Figure 1:
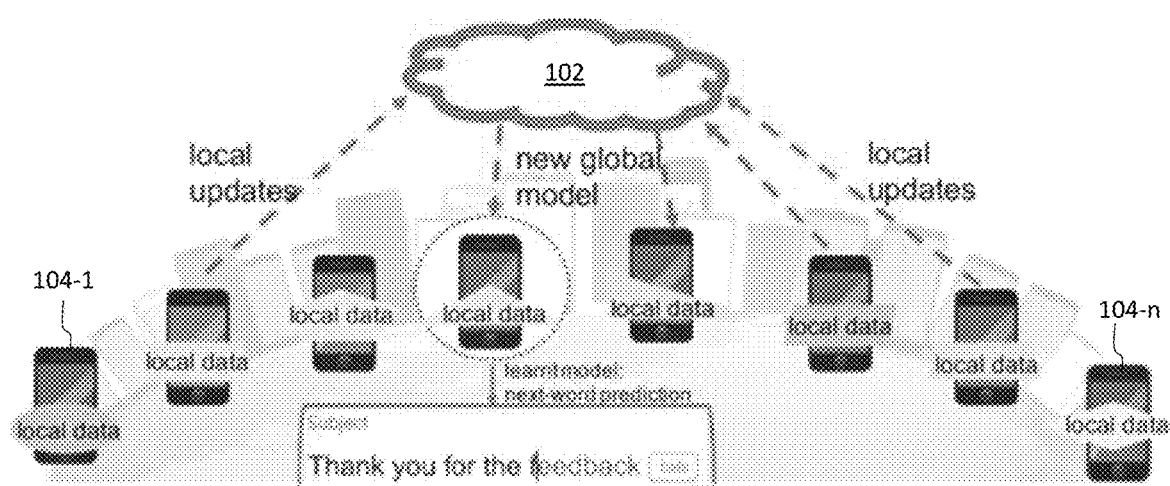
FIG. 1 is a diagram illustrating a federated learning system, according to one embodiment.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate the existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "$1^{st}$," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, or firmware, and may interchangeably be used with other terms, such as, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

Federated learning is a training paradigm that fits a model to a scenario with data in a distributed way. FIG. 1 is a diagram illustrating a federated learning system, according to an embodiment. A federated server 102 distributes a global model to client devices 104-1 to 104-$n$. The client devices 104-1 to 104-$n$ return client models with local updates to the federated server, while keeping their local data.

Although the model may maintain an acceptable average performance across client devices, the performance of the model on individual client devices may vary. For example, when collected data is skewed toward a majority group or classes, the model is prone to achieve better performance on data of such classes, compared with data of deficient classes. Accordingly, a federated learning algorithm may result in a model having a high average performance but also a high variance in performance across different client devices.

As used herein, the term "collected data" can refer to data being processed, generally. Collected data need not be data captured via sensors of the device that is doing the processing. Collected data may have already undergone some processing.

Unfairness, or high performance variance, is caused by skewed collected data distribution. Herein, averaging methods are provided that mitigate the bias within the distributed training/collected data in order to train a more fair model. The methods address statistical heterogeneity for federated learning with ZSDG (i.e., data augmentation without explicit sharing of data), and achieve a more fair model across different client devices.

Embodiments of the disclosure provide a federated learning method that employs ZSDG on deficient data distribution to mitigate statistical heterogeneity. This encourages more uniform performance accuracy across client devices in federated networks. Such methods improve accuracy and fairness simultaneously.

A first method is provided to improve the fairness of federated learning via FMIL, in which client devices (e.g., local nodes) perform model inversion on a global model that is delivered from a federated server. Accordingly, data is derived at a client device even though training data of other client devices was not shared.

A second method is provided to improve the fairness of federated learning via LMIF, in which the federated server performs model inversion on received client models to generate synthetic data, and thereby, a balanced dataset to be used in an extra training step at the federated server. Accordingly, data is derived at the server even though training data of client devices was not shared.

In accordance with the second method, the client devices may also be trained to match the layer statistics of the federated server, assuming the federated server already provides a fair model, using, for example, LMIF. This prevents the client devices from being too biased towards their own data.

In accordance with both the first and second methods, model inversion without data is performed by generating fake data, or synthetic data, from a trained model without accessing actual training data. Each data sample has a class label.

In a first embodiment of model inversion, model M is set as a neural network containing L layers. For simplicity, it is assumed that the model M has L batch normalization (BN) layers, and activations before the i-th BN layer are denoted as $z_i$.

During forward propagation, $z_i$ is normalized by mean $\mu_i$ and variance $\sigma_i$ parameterized in i-th BN layer. Note that given a pre-trained model M, BN statistics of all BN layers are stored and accessible. Therefore, in order to generate fake input $\tilde{x}$ that best matches the BN statistics stored in the BN layers and given target class $\bar{y}$, an optimization problem can be solved as set forth in Equation (2) below.

$$\min_{\tilde{x}} \sum_{i=1}^{L} \|\bar{\mu}_i^r - \mu_i\|_2^2 + \|\bar{\sigma}_i^r - \sigma_i\|_2^2 + L(M(\tilde{x}), \bar{y}) \quad (2)$$

In order to solve Equation (2), the model parameters are fixed and the input from a random sample is updated by gradient descent. Since the input reconstruction requires no training data, it is referred to as ZSDG. Since the pre-trained model M is fixed, the visual quality of the generated fake input $\tilde{x}$ is highly dependent on the performance of M.

In another embodiment of model inversion, a generator is trained to generate synthetic data using data-free adversarial knowledge distillation. The generator is trained with adversarial losses to force the generator to produce synthetic data, which performs similarly to collected data (e.g., real data or original data) for knowledge distillation from a reference network (teacher) to another network (student). The generator is trained to force its synthetic data to produce statistics that match the BN statistics stored in a reference model pre-trained with collected data. The generator is also trained such that its synthetic images produce small categorical entropy and high batch categorical entropy from the reference pre-trained network. A conditional generator may be used to generate data corresponding to a specific label.

According to an embodiment provided to improve the fairness of federated learning via FMIL, client devices (e.g., local nodes) derive data by inverting the model delivered by the federated server. This generated data is used for data-augmentation to improve training of local client models.

Herein, (x; y) is set as a real local training input/label pair and ($\bar{x}$; $\bar{y}$) is set as generated synthetic data (e.g., fake data). To mitigate statistical heterogeneity, each client device augments its training set by synthesizing data for classes having deficient collected data.

Specifically, the server distributes the model M to each client device, and the client device performs ZSDG to generate $\bar{x}$ by iterating all possible $\bar{y}$, enabling local training to be based on a more balanced dataset. For example, if ($x_i$, $y_i$) is the data for the i-th client device, and ($\bar{x}_i$; $\bar{y}_i$) is the synthetic data generated at the i-th client device, then the i-th client device will use augmented data [($x_i$, $y_i$); ($\bar{x}_i$; $\bar{y}_i$)]. After local training, the client device returns the updated model M back to the server for aggregation.

Each client device has its own set of training/collected data ($x_i$, $y_i$) that has different statistical properties, and the synthetic data generated at each client ($\bar{x}_i$; $\bar{y}_i$) is not the same due to randomness in image generation in the model-inversion process.

Figure 2:
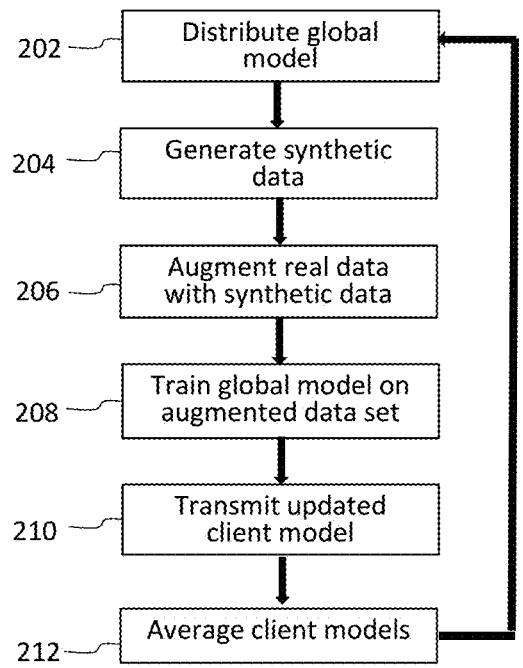
FIG. 2 is a is a flowchart illustrating a method for federated model inversion at local nodes (FMIL) using zero-shot data-generation (ZSDG), according to one embodiment.

FIG. 2 is a flowchart illustrating a method for FMIL using ZSDG, according to an embodiment. For simplicity in description, the label y, corresponding to the data element x, is removed.

At 202, at communication round t, a federated server distributes a federated global model $M_{f,t-1}$ to a subset of client devices $S_t$. At 204, each client device i in the subset of client devices $S_t$ generates synthetic data $\tilde{x}_i$ for all of the classes in the federated global model $M_f$, or for a subset of classes in which collected data is deficient, by performing model inversion on the federated global model (e.g., by using image distillation or ZSDG). At 206, each client i augments its collected data $x_i$ with the synthetic data $\tilde{x}_i$ in order to generate an augmented dataset $\{x_i, \tilde{x}_i\}_t$ that has a more uniform distribution than the collected data $x_i$ across the classes of the federated global model $M_f$.

Generally, in discerning whether a dataset has a more uniform distribution across classes, a frequency distribution of classes in the dataset is used as a metric. If the class distribution approaches a discrete uniform distribution, the dataset is more uniform. For example, if the size of the dataset (e.g., the number of labeled dataset points) is S, and there are N classes, the dataset is uniform if there are S/N labeled points for each of the N classes.

At 208, each client device i trains the federated global model $M_{f,t-1}$ on its augmented dataset, and generates an updated client model $M_{c_i,t}$. At 210, each client i transmits the updated client model $M_{c_i,t}$ to the federated server. At 212, the federated server averages the client models received from the subset of client devices $S_t$ using a weighted average $M_{f,t}=\Sigma_i\ w_i M_{c_i,t}$, and generates a new federated average model that may be redistributed to the client devices, returning the methodology to 202.

In testing the method relating to FMIL, a server may select a fraction C=0:1 of 100 clients during each communication round, with T=100 total rounds. Each selected client may train its own model for E=5 local epochs with mini-batch size B=10. Each client has at most 2 classes of images and each class contains 250 images. Starting at the 80th round, ZSDG may be launched for local training. The amount of each augmented class is 64. After data augmented federated learning, the final aggregated model is tested and the test accuracy and variance across all clients is obtained.

The final aggregated model of the FMIL method has a higher test accuracy and less variance (more fairness) compared to the standard federated average model. Specifically, performance and fairness are simultaneously improved.

The method relating to FMIL may be appropriately utilized when client devices have sufficient computational and storage complexity, such as, for example, when a client is a hospital having no access to data from other hospitals, but an interest to learn from such data.

According to an embodiment provided to improve the fairness of federated learning via LMIF, models that are delivered from local nodes are inverted at the federated server to derive synthetic data. This generated synthetic data is used by the federated server to improve the combining of the local client models, or the model averaging process.

Constraints on local client devices include limited computing resources and storage capacity, which may restrict the application of data augmentation described above with respect to FMIL. Additionally, the i-th client device may be more concerned with model performance on its own collected data $(x_i, y_i)$, rather than a general model that works for all data. Consequently, in this embodiment, ZSDG and federated learning is proposed on the federated server end.

Specifically, the federated server distributes the federated global (averaged) model M to each client device. Each client device i trains the federated global model M using its collected local data $(x_i, y_i)$. Each client device i returns an updated model $M_i$ back to the federated server. The server performs ZSDG for each updated model $M_i$ in order to generate synthetic data for each client i, and mixes the synthetic data in a balanced way. The server aggregates the newly received models into an updated averaged federated model using an averaging algorithm. The server fine-tunes the weights of the averaged model in order to generate a fair federated model via training with the mixed synthetic data.

According to another embodiment, the server runs the averaging algorithm on the received client models to generate a first averaged federated model. The server generates synthetic data (e.g., fake data) from the first averaged federated model. The server evaluates the first averaged federated model based on the generated synthetic data, and determines deficient classes. The server generates more data from its first averaged federated model for the deficient classes, and mixes the additionally generated synthetic data with the previous data, generating a dataset having more samples in the deficient classes. The server fine-tunes its first averaged model using the newly generated data.

Compared to data augmentation on client device end (FMIL), augmentation on the server end (LMIF) avoids computing and storage limits on local devices. In addition, each client device updates the received model from a same initialization point, encouraging fair model performance as a whole.

Figure 3:
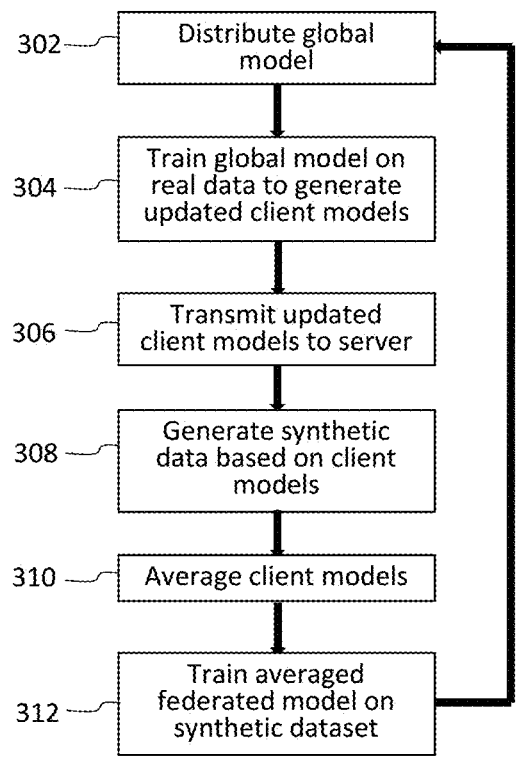
FIG. 3 is a flowchart illustrating a method for local model inversion at federated server (LMIF) using ZSDG, according to one embodiment.

FIG. 3 is a flowchart illustrating a method for LMIF using ZSDG, according to an embodiment.

At 302, at communication round t, the federated server distributes a federated global model $M_{f,t-1}$ to a subset of clients $S_t$. At 304, each client i in the subset of clients $S_t$, trains the federated global model $M_{f,t-1}$ on its true data $\{x_i\}_t$, and generates an updated client model $M_{c_i,t}$. At 306, each client i transmits its updated client model $M_{c_i,t}$ to the federated server.

At 308, the federated server performs model inversion on each received client model $M_{c_i,t}$ and generates synthetic data $\{\tilde{x}_i\}_t$ in order to generate a balanced synthetic federated dataset $\{\{\tilde{x}_f\}_t\}_t$ with a uniform distribution across the classes of the federated global model $M_f$. In another embodiment, the server may generate a skewed dataset to compensate for deficient classes if the server has prior knowledge of client data distributions.

As described above, a dataset has a more uniform distribution across classes, if the class distribution approaches a discrete uniform distribution. For example, if the size of the dataset (e.g., the number of labeled dataset points) is S, and there are N classes, the dataset is uniform if there are S/N labeled points for each of the N classes.

At 310, the federated server averages the received client models using a weighted average $\tilde{M}_{f,t}=\tau_i w_i M_{c_i,t}$. In another embodiment, the federated server generates more data from its first averaged federated model $\tilde{M}_{f,t}$ for the deficient classes form $\{\{\tilde{x}_f\}_t\}_t$, so that the dataset has more samples of the deficient classes. In yet another embodiment, the federated server augments its dataset with data generated from previous federated training epochs $\{\{\tilde{x}_f\}_t\}_t = U_{\tau=1}^t \{\{\tilde{x}_f\}_\tau\}_\tau$.

At 312, the server trains or fine-tunes the averaged federated model $\tilde{M}_{f,t}$ on the balanced synthetic federated dataset $\{\{\tilde{x}_f\}_t\}_t$, in order to generate an updated federated model $M_{f,t}$. This updated federated model may then be redistributed to the client devices by returning to 302.

The embodiments of FIG. 1 (LMIF) and FIG. 2 (FMIL) may be performed concurrently, in the same federated learning epoch, or in alternating federated learning epochs.

When a fair model is generated on the server end, the training algorithm at the local client devices (e.g., local nodes) may be changed, and the training may be regularized such that the statistics of model weights at client devices are close to that of the federated server, assuming the federated server model is better or more fair, thereby encouraging a fair local model. In an embodiment, stored BN statistics of the federated model are used. In another embodiment, statistics of the $l^{th}$ layer of the $k^{th}$ client model and the federated model f are matched for the input data at each training batch.

The weights of the $k^{th}$ user at training epoch (t+1) are updated to minimize an objective function where $F_k(\bullet)$ is the main training objective $\mu_{k,l}$, $\mu_{f,l}$ are the mean of the $l^{th}$ layer (or that stored in its corresponding batch normalization layer) of the $k^{th}$ user and the federated model, respectively. Similarly, $\sigma_{k,l}$, $\sigma_{f,l}$ are the standard deviations of the $l^{th}$ layer or those of its corresponding BN layer of the $k^{th}$ user and the federated model, respectively. The objective function is set forth in Equation (3) below.

$$w_{k,t+1} = \arg\min_w F_k(w) + \alpha \sum_l \|\mu_{k,l} - \mu_{f,l}\|^2 + \beta \sum_l \|\sigma_{k,l} - \sigma_{f,l}\|^2 \quad (3)$$

Accordingly, client devices match the statistics at the federated model, and it is implicitly assumed that the federated model is fair. This training procedure may be deployed at the client devices together with the LMIF at the federated server, which ensures that the federated model that is distributed to clients is fair.

In another embodiment, instead of minimizing the distances between the mean and variances, as described above, the distance between the distributions is minimized by minimizing the KL divergence between two Gaussian distributions with the corresponding mean and variances set forth in Equation (4) below.

$$KL\left[N\left(\mu_{k,l}, \sigma_{k,l}^2\right), N\left(\mu_{f,l}, \sigma_{f,l}^2\right)\right] = \frac{(\mu_{k,l} - \mu_{f,l})^2 + \sigma_{k,l}^2}{2\sigma_{f,l}^2} - \log\frac{\sigma_{k,l}}{\sigma_{f,l}} - \frac{1}{2}, \quad (4)$$

Figure 4:
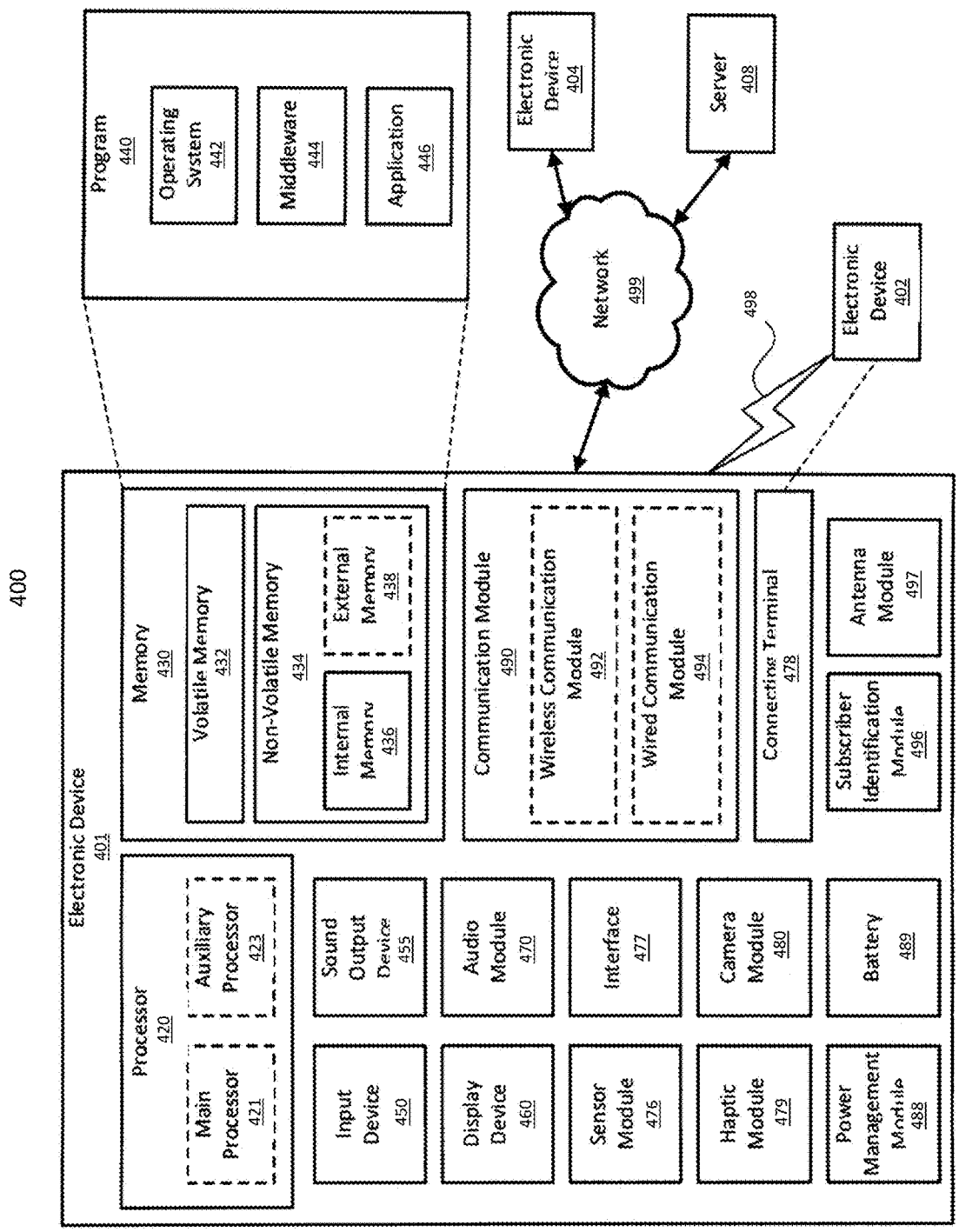
FIG. 4 is a block diagram of an electronic device in a network environment, according to one embodiment.

FIG. 4 is a block diagram of an electronic device in a network environment, according to one embodiment. With respect to the embodiment of FIG. 2, an electronic device 401 of FIG. 4 may be embodied as the client device and a server 408 of FIG. 4 may be embodied as the federated server. With respect to the embodiment of FIG. 3, the electronic device 401 may be embodied as the federated server and external electronic devices 402 and 404 of FIG. 4 may be embodied as the client devices.

Referring to FIG. 4, the electronic device 401 in a network environment 400 may communicate with the electronic device 402 via a first network 498 (e.g., a short-range wireless communication network), or the electronic device 404 or the server 408 via a second network 499 (e.g., a long-range wireless communication network). The electronic device 401 may communicate with the electronic device 404 via the server 408. The electronic device 401 may include a processor 420, a memory 430, an input device 450, a sound output device 455, a display device 460, an audio module 470, a sensor module 476, an interface 477, a haptic module 479, a camera module 480, a power management module 488, a battery 489, a communication module 490, a subscriber identification module (SIM) 496, or an antenna module 497. In one embodiment, at least one (e.g., the display device 460 or the camera module 480) of the components may be omitted from the electronic device 401, or one or more other components may be added to the electronic device 401. Some of the components may be implemented as a single integrated circuit (IC). For example, the sensor module 476 (e.g., a fingerprint sensor, an iris sensor, or an illuminance sensor) may be embedded in the display device 460 (e.g., a display).

The processor 420 may execute, for example, software (e.g., a program 440) to control at least one other component (e.g., a hardware or a software component) of the electronic device 401 coupled with the processor 420, and may perform various data processing or computations. As at least part of the data processing or computations, the processor 420 may load a command or data received from another component (e.g., the sensor module 476 or the communication module 490) in volatile memory 432, process the command or the data stored in the volatile memory 432, and store resulting data in non-volatile memory 434. The processor 420 may include a main processor 421 (e.g., a central processing unit (CPU) or an application processor (AP)), and an auxiliary processor 423 (e.g., a graphics processing unit (GPU), an image signal processor (ISP), a sensor hub processor, or a communication processor (CP)) that is operable independently from, or in conjunction with, the main processor 421. Additionally or alternatively, the auxiliary processor 423 may be adapted to consume less power than the main processor 421, or execute a particular function. The auxiliary processor 423 may be implemented as being separate from, or a part of, the main processor 421.

The auxiliary processor 423 may control at least some of the functions or states related to at least one component (e.g., the display device 460, the sensor module 476, or the communication module 490) among the components of the electronic device 401, instead of the main processor 421 while the main processor 421 is in an inactive (e.g., sleep) state, or together with the main processor 421 while the main processor 421 is in an active state (e.g., executing an application). The auxiliary processor 423 (e.g., an image signal processor or a communication processor) may be implemented as part of another component (e.g., the camera module 480 or the communication module 490) functionally related to the auxiliary processor 423.

The memory 430 may store various data used by at least one component (e.g., the processor 420 or the sensor module 476) of the electronic device 401. The various data may include, for example, software (e.g., the program 440) and input data or output data for a command related thereto. The memory 430 may include the volatile memory 432 or the non-volatile memory 434.

The program 440 may be stored in the memory 430 as software, and may include, for example, an operating system (OS) 442, middleware 444, or an application 446.

The input device 450 may receive a command or data to be used by another component (e.g., the processor 420) of the electronic device 401, from the outside (e.g., a user) of the electronic device 401. The input device 450 may include, for example, a microphone, a mouse, or a keyboard.

The sound output device 455 may output sound signals to the outside of the electronic device 401. The sound output device 455 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 460 may visually provide information to the outside (e.g., a user) of the electronic device 401. The display device 460 may include, for example, a display, a hologram device, or a projector and control circuitry to control a corresponding one of the display, hologram device, and projector. The display device 460 may include touch circuitry adapted to detect a touch, or sensor circuitry (e.g., a pressure sensor) adapted to measure the intensity of force incurred by the touch.

The audio module 470 may convert a sound into an electrical signal and vice versa. The audio module 470 may obtain the sound via the input device 450, or output the sound via the sound output device 455 or a headphone of an external electronic device 402 directly (e.g., wired) or wirelessly coupled with the electronic device 401.

The sensor module 476 may detect an operational state (e.g., power or temperature) of the electronic device 401 or an environmental state (e.g., a state of a user) external to the electronic device 401, and then generate an electrical signal or data value corresponding to the detected state. The sensor module 476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 477 may support one or more specified protocols to be used for the electronic device 401 to be coupled with the external electronic device 402 directly (e.g., wired) or wirelessly. The interface 477 may include, for example, a high definition multimedia interface (HDMI), a universal serial bus (USB) interface, a secure digital (SD) card interface, or an audio interface.

A connecting terminal 478 may include a connector via which the electronic device 401 may be physically connected with the external electronic device 402. The connecting terminal 478 may include, for example, an HDMI connector, a USB connector, an SD card connector, or an audio connector (e.g., a headphone connector).

The haptic module 479 may convert an electrical signal into a mechanical stimulus (e.g., a vibration or a movement) or an electrical stimulus which may be recognized by a user via tactile sensation or kinesthetic sensation. The haptic module 479 may include, for example, a motor, a piezoelectric element, or an electrical stimulator.

The camera module 480 may capture a still image or moving images. The camera module 480 may include one or more lenses, image sensors, image signal processors, or flashes.

The power management module 488 may manage power supplied to the electronic device 401. The power management module 488 may be implemented as at least part of, for example, a power management integrated circuit (PMIC).

The battery 489 may supply power to at least one component of the electronic device 401. The battery 489 may include, for example, a primary cell which is not rechargeable, a secondary cell which is rechargeable, or a fuel cell.

The communication module 490 may support establishing a direct (e.g., wired) communication channel or a wireless communication channel between the electronic device 401 and the external electronic device (e.g., the electronic device 402, the electronic device 404, or the server 408) and performing communication via the established communication channel. The communication module 490 may include one or more communication processors that are operable independently from the processor 420 (e.g., the AP) and supports a direct (e.g., wired) communication or a wireless communication. The communication module 490 may include a wireless communication module 492 (e.g., a cellular communication module, a short-range wireless communication module, or a global navigation satellite system (GNSS) communication module) or a wired communication module 494 (e.g., a local area network (LAN) communication module or a power line communication (PLC) module). A corresponding one of these communication modules may communicate with the external electronic device via the first network 498 (e.g., a short-range communication network, such as Bluetooth™, wireless-fidelity (Wi-Fi) direct, or a standard of the Infrared Data Association (IrDA)) or the second network 499 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 492 may identify and authenticate the electronic device 401 in a communication network, such as the first network 498 or the second network 499, using subscriber information (e.g., international mobile subscriber identity (IMSI)) stored in the subscriber identification module 496.

The antenna module 497 may transmit or receive a signal or power to or from the outside (e.g., the external electronic device) of the electronic device 401. The antenna module 497 may include one or more antennas, and, therefrom, at least one antenna appropriate for a communication scheme used in the communication network, such as the first network 498 or the second network 499, may be selected, for example, by the communication module 490 (e.g., the wireless communication module 492). The signal or the power may then be transmitted or received between the communication module 490 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

Commands or data may be transmitted or received between the electronic device 401 and the external electronic device 404 via the server 408 coupled with the second network 499. Each of the electronic devices 402 and 404 may be a device of a same type as, or a different type, from the electronic device 401. All or some of operations to be executed at the electronic device 401 may be executed at one or more of the external electronic devices 402, 404, or 408. For example, if the electronic device 401 should perform a function or a service automatically, or in response to a request from a user or another device, the electronic device 401, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 401. The electronic device 401 may provide the outcome, with or without further processing of the outcome, as at least part of a reply to the request. To that end, a cloud computing, distributed computing, or client-server computing technology may be used, for example.

One embodiment may be implemented as software (e.g., the program 440) including one or more instructions that are stored in a storage medium (e.g., internal memory 436 or external memory 438) that is readable by a machine (e.g., the electronic device 401). For example, a processor of the electronic device 401 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method for performing federated learning at a client device, the method comprising:
    receiving, at the client device, a global model from a server;
    performing model inversion on the global model to generate synthetic data for one or more classes of data in the global model, wherein performing model inversion comprises performing at least one of image distillation or zero-shot data generation (ZSDG) on the global model;
    augmenting collected data in a dataset of the client device with the synthetic data to generate an augmented dataset comprising the collected data and the synthetic data, the augmented dataset having a more uniform distribution of data across classes than the dataset;
    training the global model on the augmented dataset to generate a client model; and
    transmitting the client model from the client device to the server.

2. The method of claim 1, wherein performing model inversion comprises:
    generating the synthetic data for all classes of data in the global model; or
    generating the synthetic data for the one or more classes of data in the global model where the collected data is deficient.

3. The method of claim 1, further comprising:
    receiving, at the client device, an updated global model from the server, wherein the updated global model is generated by averaging a plurality of client models, including the transmitted client model, at the server.

4. The method of claim 1, wherein the more uniform distribution of the data is achieved when class distribution of the augmented data approaches a discrete uniform distribution.

5. A method for performing federated learning at a server, the method comprising:
    distributing a global model from the server to a plurality of client devices;
    receiving client models from the plurality of client devices, wherein each client model is received from a respective client device of the plurality of client devices;
    performing model inversion on each client model to generate synthetic data for each client model, wherein the synthetic data has a distribution of data across classes of the global model that compensates for deficient collected data in classes of the client models, and wherein performing model inversion comprises performing at least one of image distillation or zero-shot data generation (ZSDG) on each client model;
    generating a synthetic dataset using the synthetic data from the client models;
    averaging the client models to generate an averaged model; and
    training the averaged model using the synthetic dataset to generate an updated global model.

6. The method of claim 5, wherein each client model is generated by training the global model on collected data of the respective client device.

7. The method of claim 6, wherein the training of the global model at each client device is regularized such that statistics of each client model are within a specified range from statistics of the global model.

8. The method of claim 5, wherein the synthetic data has a uniform distribution of data across the classes of the global model, or a skewed distribution of data across the classes of the global model.

9. The method of claim 5, further comprising augmenting the synthetic dataset with data generated from previous training epochs.

10. A client device for performing federated learning, the client device comprising:
    a processor; and
    a non-transitory computer readable storage medium storing instructions that, when executed, cause the processor to:
        receive a global model from a server;
        perform model inversion on the global model to generate synthetic data for one or more classes of data in the global model, wherein performing model inversion comprises performing at least one of image distillation or zero-shot data generation (ZSDG) on the global model;
        augment collected data in a dataset of the client device with the synthetic data to generate an augmented dataset comprising the collected data and the synthetic data, the augmented dataset having a more uniform distribution of data across classes than the dataset;
        train the global model on the augmented dataset to generate a client model; and
        transmit the client model to the server.

11. The client device of claim 10, wherein, in performing model inversion, the instructions cause the processor to:
    generate the synthetic data for all classes of data in the global model; or
    generate the synthetic data for the one or more classes of data in the global model where the collected data is deficient.

12. The client device of claim 10, wherein the instructions further cause the processor to:
    receive an updated global model from the server, wherein the updated global model is generated by averaging a plurality of client models, including the transmitted client model, at the server.

13. The client device of claim 10, wherein the more uniform distribution of the data is achieved when class distribution of the augmented data approaches a discrete uniform distribution.

14. A server for performing federated learning, the server comprising:
    a processor; and a non-transitory computer readable storage medium storing instructions that, when executed, cause the processor to:
  distribute a global model to a plurality of client devices;
  receive client models from the plurality of client devices, wherein each client model is received from a respective client device of the plurality of client devices;
  perform model inversion on each client model to generate synthetic data for each client model, wherein the synthetic data has a distribution of data across classes of the global model that compensates for deficient collected data in classes of the client models, and wherein performing model inversion comprises performing at least one of image distillation or zero-shot data generation (ZSDG) on each client model;
  generate a synthetic dataset using the synthetic data from the client models;
  average the client models to generate an averaged model; and
  train the averaged model using the synthetic dataset to generate an updated global model.

15. The server of claim 14, wherein each client model is generated by training the global model on collected data of the respective client device.

16. The server of claim 15, wherein the training of the global model at each client device is regularized such that statistics of each client model are within a specified range from statistics of the global model.

17. The server of claim 14, wherein the synthetic data has a uniform distribution of data across the classes of the global model, or a skewed distribution of data across the classes of the global model.

18. The server of claim 14, wherein the instructions further cause the processor to augment the synthetic dataset with data generated from previous training epochs.

* * * * *